United States Patent [19]

Stevens

[11] Patent Number: 4,574,213
[45] Date of Patent: Mar. 4, 1986

[54] BEARING SUPPORT AND SEAL FOR A STARTER MOTOR HOUSING

[75] Inventor: Julius J. Stevens, Fort Deposit, Ala.

[73] Assignee: Teledyne Industries, Inc., Los Angeles, Calif.

[21] Appl. No.: 674,716

[22] Filed: Nov. 26, 1984

Related U.S. Application Data

[63] Continuation of Ser. No. 487,264, Apr. 21, 1983.

[51] Int. Cl.$^4$ .................. H02K 5/10; H02K 7/08
[52] U.S. Cl. ........................... 310/90; 384/147
[58] Field of Search ................ 290/38; 310/90; 308/DIG. 9; 384/282; 123/179 R, 179 M; 384/147, 148

[56] References Cited

U.S. PATENT DOCUMENTS

| | | |
|---|---|---|
| D. 53,409 | 6/1919 | Cosgray . |
| 1,089,181 | 3/1914 | Apple . |
| 1,148,884 | 8/1915 | Apple . |
| 1,179,779 | 4/1916 | Uhl . |
| 1,208,353 | 12/1916 | Mudge . |
| 1,232,004 | 7/1917 | Cotterman . |
| 1,288,847 | 12/1918 | DuBois . |
| 1,289,148 | 12/1918 | Fraser . |
| 1,390,077 | 9/1921 | Bijur . |
| 1,970,885 | 8/1934 | Chilton .................. 123/179 M |
| 3,084,561 | 4/1963 | Mattson .................. 290/38 R |
| 3,177,368 | 4/1965 | Seilly .................. 290/38 |
| 3,399,576 | 9/1968 | Seilly et al. .......... 290/38 R |
| 3,513,339 | 5/1970 | Harris et al. .......... 310/90 |
| 3,791,684 | 2/1974 | Hamman .................. 290/38 |
| 3,791,685 | 2/1974 | Hamman .................. 290/38 |
| 4,262,224 | 4/1981 | Kofink et al. .......... 310/90 |

Primary Examiner—Peter S. Wong
Assistant Examiner—D. L. Rebsch
Attorney, Agent, or Firm—Gifford, VanOphem, Sheridan and Sprinkle

[57] ABSTRACT

A bearing support structure in a starter motor housing includes a housing having a bore which receives a bearing and seal member disposed axially inwardly from the bearing. The bearing is exposed from the end of the starter motor to permit introduction of fluid lubricant to the bearing from a remote source while the seal prevents lubricant, particulate matter and environmental debris from entering the interior of the starter motor housing, thereby preventing harmful deposits on the electrical components within the starter motor. In the preferred embodiment, the housing comprises an end plate for a tubular starter motor housing.

7 Claims, 2 Drawing Figures

BEARING SUPPORT AND SEAL FOR A STARTER MOTOR HOUSING

This application is a continuation of application Ser. No. 487,264, filed Apr. 21, 1983.

BACKGROUND OF THE INVENTION

I. Field of the Present Invention

The present invention relates generally to a housing for an electrical starter motor, and more particularly, to particular construction of a bearing support for rotatably supporting a rotor shaft within the motor housing.

II. Description of the Prior Art

As is well known, electric motors such as starter motors for internal combustion engines include a rotor shaft rotatably mounted within the motor housing. A rotor winding is secured to the rotor shaft for rotation therewith which is coaxially arranged within a set of stator windings. While the interaction of the electromagnetic forces between the stator windings and rotor windings causes rotation of the rotor shaft, it is necessary to support the shaft in a manner which maintains the alignment between the stator winding and the rotor winding. Thus, bearings are provided in the starter motor housing for rotatably supporting the shaft.

Quite often the bearing assemblies are ball or roller bearing assemblies which require lubrication to minimize resistance to rotation, and to prolong the life of the bearing parts. The bearing support structure is often provided with fluid passageways to direct a supply of lubricant to the bearing. Thus, construction of the bearing support to include such lubricating means increases the cost and complexity of the bearing housing. In addition, it is necessary to protect the electrical components of the starter motor from environmental conditions and debris, and the housing is, therefore, constructed so as to completely enclose the windings and other electrical components within the housing. However, the space intermediate the rollers between the inner and outer race of the bearing permit dust and other environmental debris to enter within the housing and build up upon the internal parts of the starter motor. Thus, the axially outermost end of the bearing may be provided with a seal to prevent the introduction of foreign matter through the bearing and into the interior of the motor housing. However, such placement of the seal further complicates or restricts placement of lubricant passages which provide lubricant to the bearing. Moreover, such an arrangement does not prevent lubricant from entering the interior of the starter motor housing and contaminating the components therein.

While self-lubricating bearing materials can be used to eliminate the need for continuous lubrication of the bearing, the above described seal arrangement fails to protect the starter motor components from particulate debris which can result from wear on the self-lubricating material. In addition, disassembly of the housing or modified construction of the housing would be necessary to provide supplemental lubrication to the bearing.

SUMMARY OF THE INVENTION

The present invention overcomes the above-mentioned disadvantages by providing a starter motor housing assembly in which the bearing support structure supports a bearing at one axial end of the starter motor and which includes seal means intermediate the bearing and the interior of the starter housing. The bearing is positioned at the axial end of the starter motor housing to be exposed to the exterior of the housing so that a supplemental lubricant can be readily introduceed into the bearing structure. Nevertheless, the lubricant and other environmental debris are sealed from the interior of the housing so that the electrical components remain clean and can operate at the highest capacity.

In the preferred embodiment of the present invention, the bearing support structure comprises an end cap for a tubular starter motor housing. The end cap includes an annular peripheral portion to fit the open end of the tubular housing and, thus, substantially enclose the components of the starter motor within the housing. The end cap further includes an axially aligned annular sleeve portion having an inner peripheral wall which supports a bearing therein and which further supports an annular seal ring axially inward of the bearing.

Thus, the present invention provides a bearing support structure which permits support of the rotor shaft by a well lubricated bearing and which prevents contamination of the components within the housing by the lubricant or environmental debris. Since the structure is simple, the device is inexpensively produced and is easy to maintain. The construction includes a minimum number of parts and thus substantially decreases the wear and complexity of the starter motor, and is therefore, especially advantageous for use in a starter motor for an engine in an aircraft, although as will be apparent, it will have use in engines for other applications as well.

BRIEF DESCRIPTION OF THE DRAWING

The present invention and its advantages will be more clearly understood by reference to the following detailed description of a preferred embodiment, when read in conjunction with the accompanying drawing in which like reference characters refer to like parts in the views, and in which.

DETAILED DESCRIPTION OF A PREFERRED EMBODIMENT OF THE PRESENT INVENTION

Figure 1:
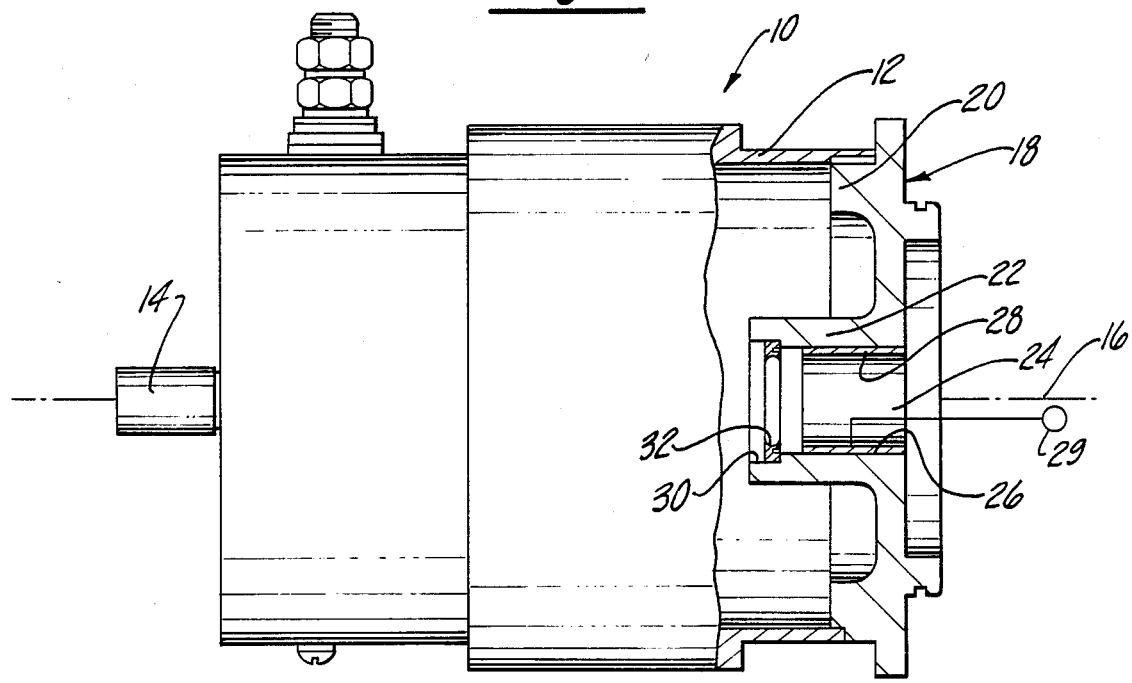
FIG. 1 is a broken side view showing a sectional elevation of a portion of a starter motor constructed in accordance with the present invention.

Referring now to FIG. 1, a starter motor 10 according to the present invention is shown comprising a tubular housing 12 coaxially aligned with a rotor shaft 14 about an axis 16. The rotor shaft 14 supports a rotor winding (not shown) axially aligned with a stator winding (not shown) disposed along the inner circumference of the tubular housing 12 in the conventional manner.

One end of the tubular housing 12 is enclosed by an end plate 18 having an annular peripheral wall portion 20 which is slidably received in the open end of the housing 12. Appropriate means such as welds, bolts or the like are used to secure the end plate 18 to the tubular housing 12. The end plate 18 also includes a central annular sleeve portion 22 which forms a bearing support for a bearing 28, through which the shaft 14 can be inserted. The annular sleeve portion 22 defines a bore 24 within a peripheral wall portion 26 engaging the outer surface of the bearing 28. The bearing 28 is positioned at the axially outward end of the bore 24 so that the bearing 28 is exposed exteriorly of the axial end of the starter motor 10 and is therefore positioned so that lubricant can be introduced to the bearing 28 from the axial end of the starter motor 10.

While the particular means for directing lubricant to the bearing can be varied—it can, for instance, comprise a splash system or a pressurized injection system—placement of the bearing at the axial end of the bore 24 permits the use of a wide variety of previously known lubrication systems.

In addition, the annular sleeve portion 22 of the end plate 18 includes a bore portion 30 axially positioned inwardly from the bore portion 24. An annular seal ring 32 preferably formed from a pliable, resilient material is entrained in the bore portion 30. The central opening in annular ring 32 has a diameter the same as or slightly less than the diameter of the shaft 14 so that the ring 32 compressively seals against the shaft 14 and prevents lubricant or environmental debris from entering into the interior of the housing 12, thus protecting the electrical components of the starter motor.

The bearing 28 used in the preferred embodiment of the present invention comprises a sleeve made of a self-lubricating material. Such a bearing is substantially less expensive than ball or roller bearings and, thus, further serves to decrease the cost and weight of the starter motor according to the present invention. The useful life of the bearing is prolonged by positioning it at the axially outward end of the bore 24 as discussed above so that the bearing is exposed to a remote lubrication system 29. Moreover, any particulate matter caused by wearing out the bearing material is prevented from entering the interior of the housing by the annular seal ring 32.

Figure 2:
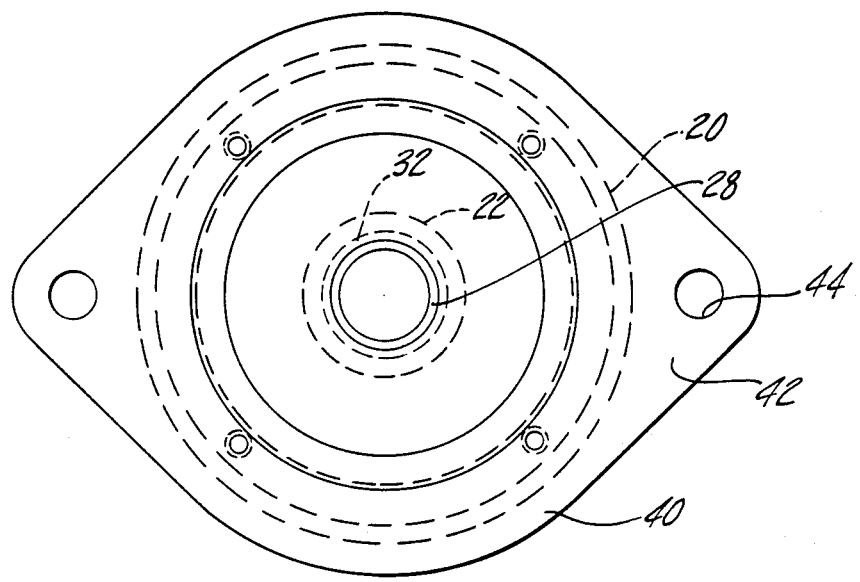
FIG. 2 is a front plan view of the starter motor shown in FIG. 1.

Referring now to FIG. 2, the end plate 18 also includes a peripheral end flange 40 which abuts against the axial end of the tubular housing 12 and which includes extended flange portions 42 on opposite sides of the flange. Each extended flange portion 42 includes a mounting hole 44, through which an appropriate fastener (not shown) can be inserted to secure the end plate 18 and thus the starter motor 10 to an appropriate support structure. As shown in FIG. 1, the end plate 18 is secured to the driving end of the starter motor 10 at which a premium gear is secured to the shaft 14. Thus, the extended flange portions 42 permit the starter motor 10 to be secured to a fly wheel housing in a well known manner. However, it is to be understood that the end plate 18 could also be provided at the opposite end of the starter motor.

Thus, the present invention provides a bearing support structure for a starter motor housing in which the bearing is disposed at an axial end of the starter motor and is, therefore, exposed exteriorly of the starter motor for connection to a lubricant system. In addition, the bearing support structure includes sealing means which prevents lubricant, particulate matter and environmental debris from entering into the interior of the starter motor housing, because it is disposed axially inwardly of the bearing. While the bearing support in the preferred embodiment is provided in an end cap for a tubular starter motor housing, it will be understood that the structure can also be employed in a closed end starter motor housing without departing from the scope of the invention. Moreover, when a single piece sleeve bearing made of a self-lubricating material is used as a bearing, a starter motor according to the present invention is substantially lighter and less expensive than previously known bearing supports for rotor shafts in a starter motor.

Having thus described my invention, many modifications thereto will become apparent to those skilled in the art to which it pertains without departing from the scope and spirit of the present invention as defined in the appended claims.

What is claimed is:

1. A starter motor housing having a shaft rotatably mounted therein comprising:

a tubular and cylindrical housing member, said housing member open at one end and forming an interior housing chamber, a circular end plate having an integral elongated sleeve with an axial bore extending axially outwardly from one side of said end plate, means for detachably securing said end plate to said open end of said housing so that said sleeve extends axially inwardly into said housing chamber, said axial sleeve bore forming a bearing surface for the shaft, a resilient seal carried adjacent an inner end of said sleeve, said seal engaging an outer peripheral surface of the shaft, said seal being radially compressed between said sleeve and the shaft to thereby form a fluid tight seal between said sleeve and the shaft, wherein said seal forms the only fluid seal between said shaft and said end plate so that a lubricant can flow from an outer end of said sleeve and along said bearing surface.

2. The invention as defined in claim 1 wherein said bearing surface slidably receives a bearing therein.

3. The invention as defined in claim 1 wherein said bearing comprises a sleeve bearing positioned in said sleeve bore, wherein one end of said bearing is exposed exteriorly of said housing.

4. The invention as defined in claim 3 wherein said bearing is made of a self-lubricating bearing material.

5. The invention as defined in claim 3 and further comprising a lubricant supply means remote from said end member for introducing lubricant to said exposed end of said bearing.

6. The invention as defined in claim 1 wherein said seal means includes a pliable resilient annular ring.

7. The invention as defined in claim 1 wherein said end plate includes a radial flange having means for mounting said housing to a support frame.

* * * * *

UNITED STATES PATENT AND TRADEMARK OFFICE
CERTIFICATE OF CORRECTION

PATENT NO. : 4,574,213
DATED : March 4, 1986
INVENTOR(S) : Julius J. Stevens

It is certified that error appears in the above-identified patent and that said Letters Patent are hereby corrected as shown below:

Col. 1, line 26, after "shaft" insert --therein--;

line 30, delete "The" and insert --Thus, the--;

line 62, after "THE" insert --PRESENT--.

Col. 2, line 38, after "side" insert --plan--.

Col. 4, line 4, before "invention" insert --present--.

Signed and Sealed this

Eighteenth Day of November, 1986

Attest:

DONALD J. QUIGG

*Attesting Officer*    *Commissioner of Patents and Trademarks*